United States Patent
Tamilarasan et al.

(10) Patent No.: US 11,281,387 B2
(45) Date of Patent: Mar. 22, 2022

(54) MULTI-GENERATIONAL VIRTUAL BLOCK COMPACTION

(71) Applicant: EMC IP Holding Company LLC, Hopkinton, MA (US)

(72) Inventors: Ashok Tamilarasan, Shrewsbury, MA (US); Vamsi Vankamamidi, Hopkinton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/458,496

(22) Filed: Jul. 1, 2019

(65) Prior Publication Data

US 2021/0064236 A1 Mar. 4, 2021

(51) Int. Cl.
*G06F 3/06* (2006.01)

(52) U.S. Cl.
CPC ............ *G06F 3/064* (2013.01); *G06F 3/0604* (2013.01); *G06F 3/0608* (2013.01); *G06F 3/0644* (2013.01); *G06F 3/0665* (2013.01); *G06F 3/0673* (2013.01)

(58) Field of Classification Search
CPC ...... G06F 3/064; G06F 3/0608; G06F 3/0665; G06F 3/0673; G06F 3/0604; G06F 3/0644; G06F 3/0652

USPC .................................................. 711/154, 203
See application file for complete search history.

(56) References Cited

U.S. PATENT DOCUMENTS

| | | | | |
|---|---|---|---|---|
| 2012/0011340 | A1* | 1/2012 | Flynn ................... | G06F 12/0292 711/171 |
| 2013/0024607 | A1* | 1/2013 | Park ....................... | G11C 29/82 711/103 |
| 2013/0297867 | A1* | 11/2013 | Wright .................. | G06F 16/182 711/112 |
| 2019/0220396 | A1* | 7/2019 | Lin ....................... | G06F 12/1009 |
| 2020/0065408 | A1* | 2/2020 | Desai ................... | G06F 16/2246 |
| 2020/0272455 | A1* | 8/2020 | Mezaael ................ | H04W 4/40 |

* cited by examiner

*Primary Examiner* — Hashem Farrokh
(74) *Attorney, Agent, or Firm* — Krishnendu Gupta; Deepika Bhayana; Dorothy Wu Chiang

(57) ABSTRACT

A method, system, and computer program product for multi-generational virtual block compaction comprising identifying a first virtual block, the first virtual block being associated with a first generation number, determining a second virtual block as an appropriate target for live information in the first virtual block, creating an association between the second virtual block and the first virtual block, updating the live information in the first virtual block to be associated with the second virtual block, updating a generation information mapping associated with the first virtual block; and associating a second generation number with the first virtual block.

20 Claims, 8 Drawing Sheets

MULTI-GENERATIONAL VIRTUAL BLOCK COMPACTION

BACKGROUND

Technical Field

This application relates to data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes. Disk arrays may also include groups of physical disks that are logically bound together to represent contiguous data storage space for applications.

It is desirable to efficiently manage and monitor data storage systems for a variety of different reasons, such as, for example, to more efficiently use the resources required to store and manage data.

SUMMARY OF THE INVENTION

Embodiments of this disclosure relate to a method, system, and computer program product for multi-generational virtual block compaction comprising identifying a first virtual block, the first virtual block being associated with a first generation number, determining a second virtual block as an appropriate target for live information in the first virtual block, creating an association between the second virtual block and the first virtual block, updating the live information in the first virtual block to be associated with the second virtual block, updating a generation information mapping associated with the first virtual block; and associating a second generation number with the first virtual block.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
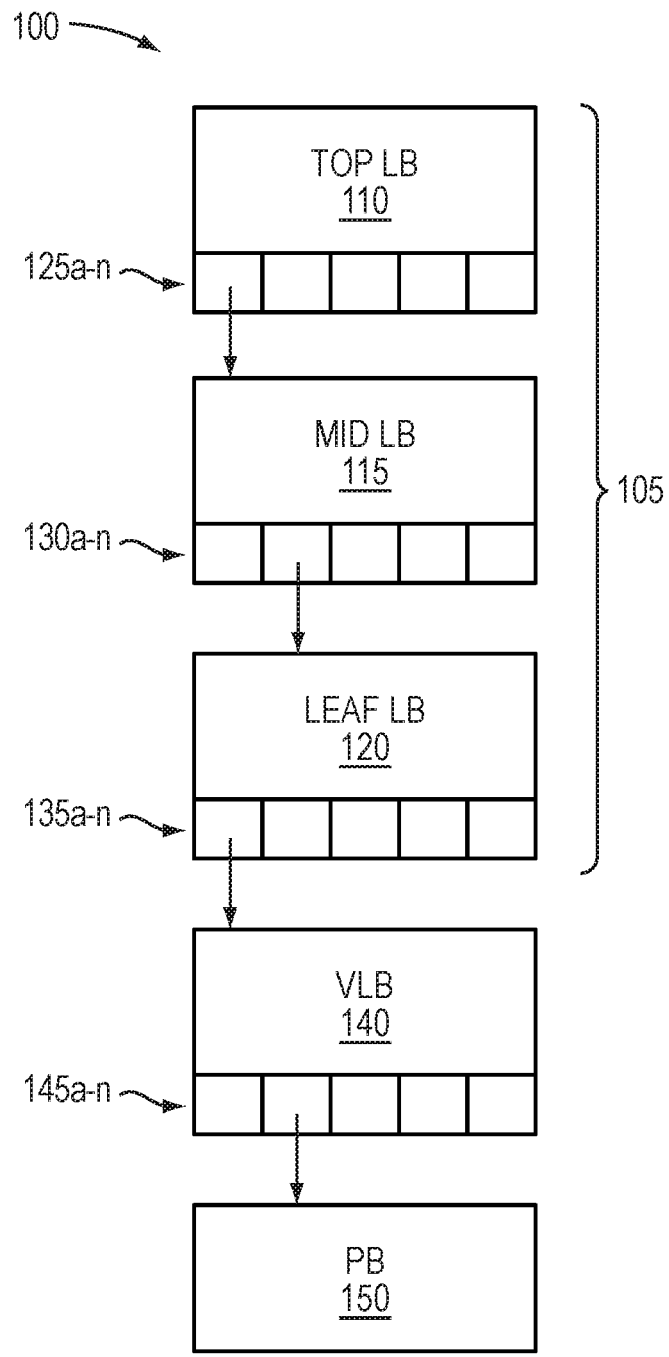
FIG. 1 is a simplified block diagram of an example system, in accordance with an embodiment of the present disclosure.

Described below is a technique for use in, for example multi-generational virtual block compaction, which technique may be used to provide, among other things, identifying a first virtual block, the first virtual block being associated with a first generation number, determining a second virtual block as an appropriate target for live information in the first virtual block, updating the live information in the first virtual block to be associated with the second virtual block, associating a second generation number with the first virtual block, creating an association between the second virtual block and the first virtual block, and updating a generation information mapping associated with the first virtual block.

In some embodiments, data storage systems can use a log-structured file system to store data. A log-structured file system can provide speed advantages over other forms of data storage by, for example, grouping a series of writes of data, rather than writing each piece of data separately. In this way, efficiencies can be realized by decreasing the amount of input/output (IO) between an application and underlying data storage. In a log-structured file system, all writes are performed sequentially, such that a write performed at time t1 is physically located sequentially following a write performed at time t0. This technique is also used when updating or overwriting data, such that rather than updating the previously written data in place (which typically requires searching for the previously written data, which can be time-consuming), the log-structured file system keeps track of the last position in physical storage used to write data most recently (which data may be unrelated to the data to be updated), and writes the updated data to a new location—typically sequentially following the most recently written data—and updates the new end position of the written data. In addition, pointers pointing to the old data are updated to point to the newly written data, reflecting the fact that the data has been updated such that reads will now return the new data rather than the old data. In some embodiments, a collection of logical blocks and/or virtual blocks are used to provide data services to users and/or applications. In a log-structured file system, a collection of logical blocks—sometimes arranged in a tree structure—can be used to provide a way to map locations of data stored on physical storage for use by other applications. This technique is sometimes known as establishing a logical block address (LBA). In some embodiments, each logical block in the collection is the same size, for example 4K bytes. In some embodiments each logical block is associated with an address where the logical block is located (for example, an address in volatile memory, or in persistent memory, or the like). In some embodiments, each logical block can store metadata, e.g., pointers, a generation number (explained below), and the like. In some embodiments, pointers are used to associate one instrumentality (e.g., data, block, and the like) with another. In some embodiments information is associated with a block by being stored in the block. In some embodiments, each logical block's storage is arranged in 4K pages. In some embodiments, logical blocks' storage contains pointers, e.g., up to 512 pointers in the case of a 4K logical block. In some embodiments, each pointer takes up 7 bytes. In some embodiments, the storage that is not used for pointers is used for storing other information (e.g., metadata, pointer offsets, lookup tables, and the like). In some embodiments, each pointer in each logical block is associated with an index that indicates where in a logical block a particular pointer is located. In some embodiments, each pointer includes an address (e.g., of another block) and an index or offset to a particular location, which when combined with the address identifies a particular location within, for example, a block located at the respective address. In some embodiments, a tree structure of logical blocks is arranged in three levels; a top-level logical block, a number of mid-level logical blocks (typically corresponding to the number of pointers in the top level block, e.g., 512 mid-level 4K blocks), and a number of leaf logical blocks (typically corresponding to the number of pointers in the mid-level blocks, e.g., 512*512 4K blocks). In this way, data written to, e.g., physical location 1 (assuming locations start with address 0), would be located by starting at the top-level logical block, following the pointer in location or address 0 that points to mid-level block 0, index 0 (because physical location 1 is within the $0^{th}$ portion of the 512 GB addressed by the top LB), following the pointer in index 0 of mid-level block 0 that points to leaf block 0, index 1 (because physical location 1 is within the $0^{th}$ portion of the 1 GB addressed by the $0^{th}$ mid LB), and following the pointer in index 1 of leaf block 0 (because physical location 1 is within the $1^{st}$ portion of the 2 MB addressed by the $0^{th}$ leaf LB). In addition, virtual blocks can be used in a layer in between the logical blocks and the physical data storage to provide a mapping between logical blocks and physical blocks and to provide data storage services, such as deduplication and compression. In some embodiments, deduplication can be accomplished by having multiple pointers in leaf blocks point to the same index in the same virtual block. In some embodiments, the leaf block pointers point to virtual blocks and the virtual blocks point to physical storage. In some embodiments, the virtual blocks are the same size as the logical blocks, e.g., 4K bytes. In some embodiments, compression can be accomplished by compressing the data to be written to a physical block, writing the compressed data to physical storage, and saving the size and location of the compressed data in the associated virtual block; in this way when a read is requested for the written data, the compressed data can be retrieved, decompressed, and sent back to the requestor. In some embodiments, each virtual block contains a fixed number of pointers, e.g. 512 in the case of a 4K virtual block. In some embodiments, when data located at a particular physical location is to be updated/overwritten, the pointer at the corresponding index in the corresponding virtual block is no longer of use (because in the log-structured file system, the data is written to a new location rather than updating the old location). In some embodiments, to represent that a pointer is no longer of use, a specific value may be written into the pointer's location in storage, for example hexadecimal FFFF. Over time, as more data is targeted to be overwritten, the virtual blocks can become sparse (e.g., containing more and more 0s in the indices) as the virtual blocks point to fewer and fewer in-use data (sometimes known as "live" or "active" data), leading to inefficiency in the amount of resources used. For example, even though most of a virtual block's indices may be available to point to new data, because the virtual block may still point to some active data, a fresh virtual block may be allocated when writing new data, rather than using an existing virtual block with available indices for pointers. If the system were to attempt to reuse the areas of inactive data, that would lead to mixing hot data (recently written) and cold data (not accessed for a certain period of time) in the virtual blocks, which would lead to other inefficiencies; for example, interfere with the ability to promote hot data to faster storage, which is desirable.

It is important to efficiently manage resource utilization in a log-structured file system to keep costs down and keep data throughput up. Typically, it has been difficult in data storage environments to efficiently manage resource utilization in a log-structured file system. Typically, more are used by virtual blocks as more data is updated or overwritten. This can lead to slower throughput as resource availability decreases and increased costs (for example, by needing to use larger amounts of memory, storage, and compute resources).

By contrast, in at least some embodiments in accordance with the technique described below, a method and system are provided for an improved utilization of resources within a data storage system by multi-generational virtual block compaction. Thus, in at least one embodiment of the current technique, a user of a system is able to better utilize resources within a data storage system by multi-generational virtual block compaction by the system identifying a first virtual block, the first virtual block being associated with a first generation number, determining a second virtual block as an appropriate target for live information in the first virtual block, updating the live information in the first virtual block to be associated with the second virtual block, associating a second generation number with the first virtual block, creating an association between the second virtual block and the first virtual block, and updating a generation information mapping associated with the first virtual block. And in at least one embodiment of the current technique, a user of the system is able to better utilize resources within a data storage system by the system enabling identifying the first block comprises determining that the first virtual block is sparse.

In at least some embodiments in accordance with the techniques as described herein, the use of the way to better utilize resources within a data storage system can provide one or more of the following advantages: lower the amount of storage required, lower the cost of the overall data storage system, increase the data throughput, and the like.

FIG. 1 depicts an example embodiment of a system that may be used in connection with performing the techniques described herein. In some embodiments, a data storage environment 100, sometimes also known as a map, includes a collection of logical blocks 105, virtual blocks 140, and physical blocks 150. In some embodiments, applications (not shown) send data write commands and associated data to the data storage system 100. In some embodiments, the data write commands and associated data are cached. In some embodiments, when the cache becomes full, the cache is flushed to physical blocks 150, wherein the map 100 is created in response to the flush. Physical storage 150 may be actual physical storage such as hard disk, flash, or the like, or may be virtual storage, for example a one or more virtual machine disks. In some embodiments, each logical block 105 in the map 100 is of the same size, e.g., 4K bytes. In some embodiments, the map 100 is arranged in a multi-level tree structure as shown, although other embodiments are possible, such as a two-level tree, or a flat table that maps the logical location with the physical location. In some embodiments, the map 100 includes a top-level logical block (top LB) 110. In some embodiments, the map 100 includes one or more mid-level logical blocks (mid LB) 115. In some embodiments, the map 100 includes one or more leaf logical blocks (leaf LB) 120. In some embodiments, the top LB 110 has one or more pointers 125a-n associated with it. In some embodiments the one or more pointers 125a-n are located within the top LB 110 at indices, whereby each of the one or more pointers 125a-n is located at a different index within top LB 110. In some embodiments, the one or more pointers 125a-n each point to a mid LB 115. In some embodiments, each mid LB 110 has one or more pointers 130a-n associated with it. In some embodiments the one or more pointers 130a-n are located within each of the respective one or more mid LBs 115 at indices, whereby each of the one or more pointers 130a-n is located at a different index within each of the respective one or more mid LBs 115. In some embodiments, the one or more pointers 130a-n each point to a leaf LB 120. In some embodiments, each leaf LB 120 has one or more pointers 135a-n associated with it. In some embodiments the one or more pointers 135a-n are located within each of the respective one or more leaf LBs 120 at indices, whereby each of the one or more pointers 135a-n is located at a different index within each of the respective one or more leaf LBs 120. In some embodiments, the one or more pointers 135a-n each point to a virtual block (VLB) 145.

In some embodiments, each VLB 140 has one or more pointers 145a-n associated with it. In some embodiments the one or more pointers 145a-n are located within each of the respective one or more VLBs 140 at indices, whereby each of the one or more pointers 145a-n is located at a different index within each of the respective one or more VLBs 140. In some embodiments, the one or more pointers 145a-n each point to a block (PB) 150 in physical storage, where the actual data associated with the write command is stored.

In some embodiments, the pointers 125a-n, 130a-n, 135a-n, and 145a-n are a combination of an address of the block pointed to and an index within the pointed to block. In some embodiments, the address of the block pointed to and the index within the pointed to block are encoded into a single value. In some embodiments, the address of the block pointed to and the index within the pointed to block are stored as separate values and used together or combined when needed (e.g., when locating the actual contents at the specific location being referenced). In this way, the map 100 can be traversed by following the pointers.

Figure 2:
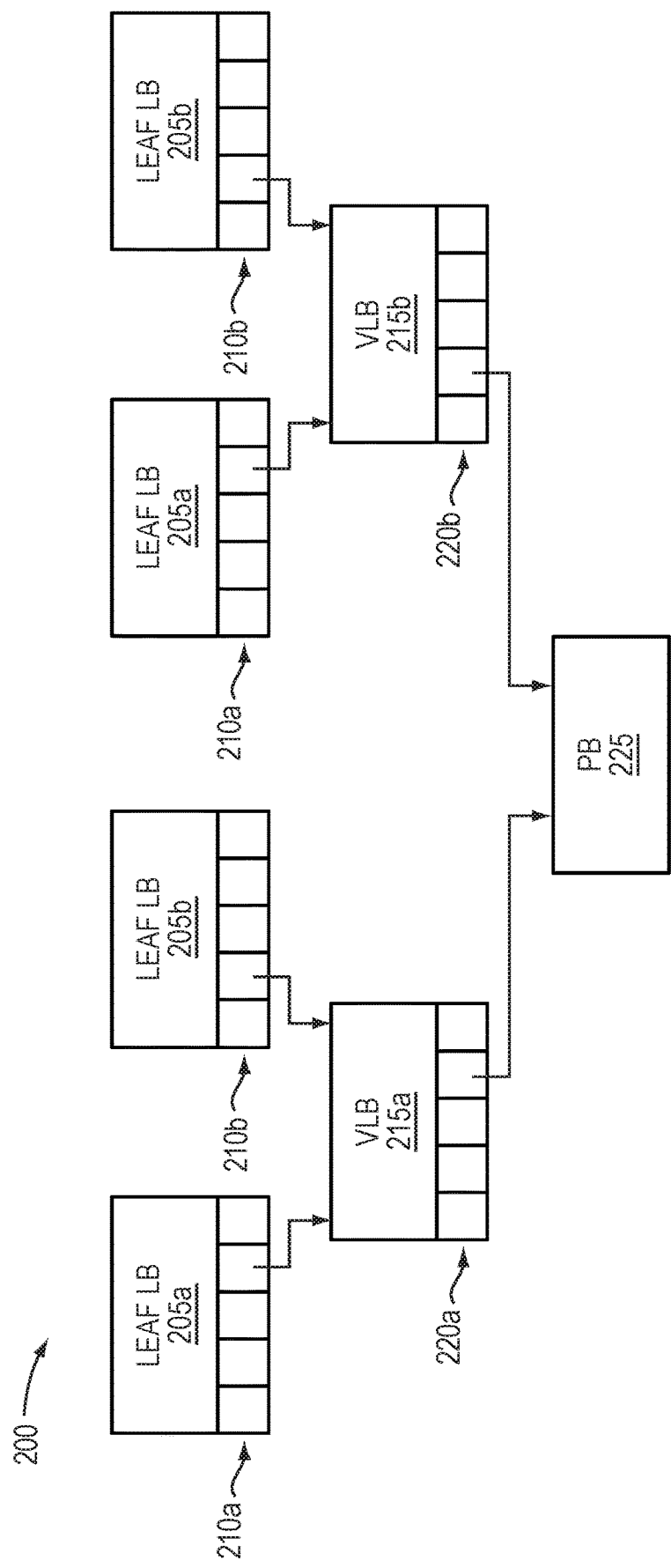
FIG. 2 is a simplified block diagram of an example system, in accordance with an embodiment of the present disclosure.

FIG. 2 depicts an example embodiment of a system that may be used in connection with performing the techniques described herein. Shown is an example portion of a map as described in FIG. 1. In some embodiments, leaf LBs 205a-d contain pointers in storage 210a-d, respectively to VLB 215a and VLB 215b. As shown, leaf LB 205a points to VLB 215a through a pointer in location 3 (e.g., 0-indexed, although other techniques are contemplated: 1-indexing, lookup table, and the like) of the storage 210a of leaf LB 205a. Leaf LB 205b points to VLB 215a through a pointer in location 1 of the storage 210b of leaf LB 205b. Leaf LB 205c points to VLB 215b through a pointer in location 1 of the storage 210c of leaf LB 205c. Leaf LB 205d points to VLB 215b through a pointer in location 3 of the storage 210d of leaf LB 205d. In some embodiments, VLB 215a and VLB 215b contain pointers in storage 220a and 22b, respectively, to PB 225. As shown, VLB 215a points to PB 225 through a pointer in location 3 of the storage 220a of VLB. VLB 215b points to PB 225 through a pointer in location 1 of the storage 220b of VLB 215b. Because, for example, VLB 215a points to PB 225 through a pointer in location 3 of the storage 220a of VLB, the pointer in location 3 of the storage 210a of leaf LB 205a includes the address of VLB 215a and an offset 3 (corresponding to location 3 in the storage 220a of VLB 215a).

In some embodiments, existing data may be targeted for updating or overwriting. For example, at a previous point in time, t0, all zeros may have been written to a location, and at a later point in time, t1, a write request is received for writing all ones to the same location. In some embodiments, in response, the respective pointer in the respective leaf LB will be updated to point to a different VLB corresponding the PB where the newly written data is located, as explained above with regards to log-structured file systems. As more and more existing data is targeted for updating or overwriting, the VLBs will become sparse. For example, say a particular VLB was pointed to by many leaf LBs, whereby the VLB was mostly or completely filled with pointers to PB locations that contain live or active data (i.e. data that can be read). After many overwrites/updates to that data, the data is no longer live and thus the VLB will be pointed to by many fewer leaf LBs (e.g., two or three), and likewise, the VLB will contain very few (e.g., two or three) live pointers to PBs. Yet, because the VLB is still pointed to by at least one leaf LB, the VLB is not available for reuse (for example, during a subsequent write of data), due to, for example the desire not to mix hot and cold data as described above. Instead a new VLB will be freshly allocated. In this way, the map will consume many more resources (e.g., memory or storage associated with sparse VLBs) than would otherwise be desired.

Figure 3:
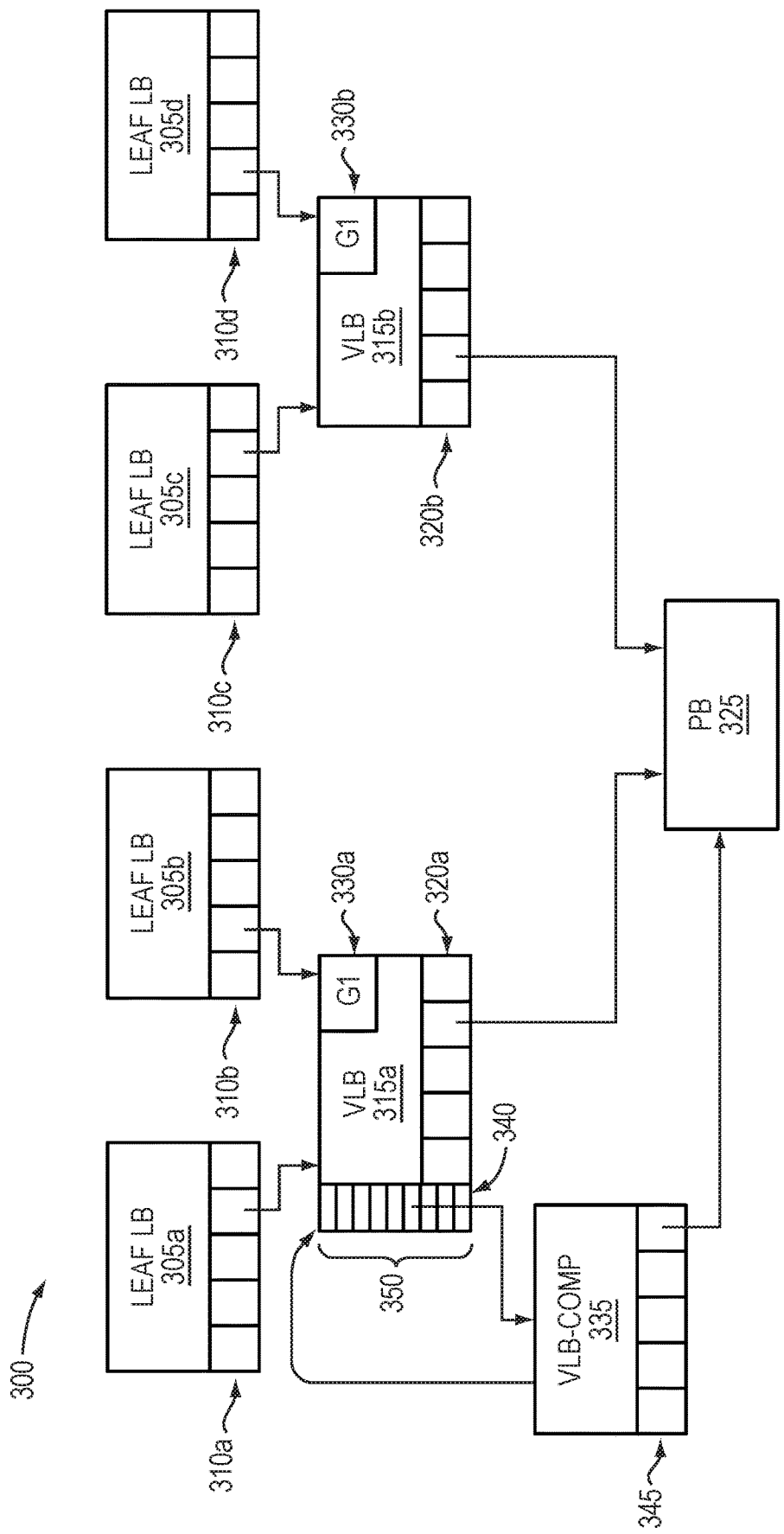
FIG. 3 is a simplified block diagram of an example system, in accordance with an embodiment of the present disclosure.

FIG. 3 depicts an example embodiment of a system that may be used in connection with performing the techniques described herein. Shown is an example portion of a map as described in FIGS. 1 and 2. In some embodiments, VLBs 315a-b have associated generation numbers 330a-b; although shown here as being stored within the respective VLB, other embodiments are possible, such as storing a separate file or database mapping that associates generation numbers with respective VLBs. In some embodiments, generation numbers 330a-b are initialized to a value (e.g., 0; as shown, G1) when a VLB is newly allocated. In some embodiments when Leaf LBs 305a-d pointers in leaf LB storage 310a-d to VLBs are instantiated, the generation number 330a-b from the pointed to VLB 315a-b are associated with the respective pointer. For example, with respect to leaf LB 305a, the generation number 330a of VLB 315a, here G1, is stored in storage 310a location 3 along with the pointer to VLB 315a and the index into VLB 315a storage 320a; although shown here as being stored within the respective leaf LB, other embodiments are possible, such as storing a separate file or database mapping that associates generation numbers with respective pointers in leaf LBs. In some embodiments, VLB 315a may be identified as sparse as described above with respect to FIG. 2. In some embodiments, the identification may be made in response to a determination to perform a garbage collection. In some embodiments, the determination to perform a garbage collection is based on the percentage of physical storage in use. For example, when the percentage of physical storage in use exceeds a threshold, such as 50% or 60% a garbage collection is initiated. In some embodiments, the threshold percentage can be predetermined, computed, set by a user or an administrator, and the like. In some embodiments, the identification may be based on the ratio of storage locations 320a containing live pointers versus the total number of storage locations 320a. In some embodiments, ratios of about 10-30% live versus total storage is considered sparse. In some embodiments, the ratio may be predetermined. In some embodiments, the ratio may be specified by a user or computed.

In some embodiments, in response to the identification, a VLB 335, sometimes known as a compact VLB or VLB-comp, may be determined as an appropriate target for the live information (e.g., live pointers and associated indices and generation numbers) of VLB 315a. In some embodiments, the determining comprises comparing the size of available space in VLB-comp 335 to the size of the live information of VLB 315a so that VLB 335 contains enough space to store the live information of VLB 315a. In some embodiments, VLB-comp 335 is updated such that the live information from VLB 315a is associated with VLB-comp 335. In some embodiments, updating VLB-comp 335 comprises copying the live information from VLB 315a to VLB-comp 335. In some embodiments, copying the live information from VLB 315a to VLB-comp 335 comprises arranging the live information in sequential storage locations 345 within VLB-comp 335. In some embodiments, after the copying of the live information from VLB 315a, the storage for the live information in VLB 315a is set to a specific value, e.g., hexadecimal FFFF, to indicate that storage location in VLB 315a no longer points to live data and is available for reuse. In some embodiments, when a virtual block is available for reuse it is returned to a pool of available blocks. Setting the storage location value in this way can be useful for tracing, debugging, and the like. In some embodiments, an association is created between the current generation number 330a of VLB 315a and VLB-comp 335. In some embodiments, there is space reserved in VLB 315a for a generation information mapping 340. In some embodiments, the generation information mapping 340 is a table of entries 350. In some embodiments, each entry 350 in the table 340 corresponds to a generation number of a VLB, here, generation number 330a of VLB 315a. In some embodiments, when an entry 350 in the table 340 is created, the current generation number of the associated VLB is used to determine where the new entry 350 should be located within the table 340. For example, the current generation number can be used, e.g., as an index, as an array index, as an address offset, or the like. In some embodiments, an entry 350 in the table 340 comprises a pointer to the VLB-comp 335 in which the live information from VLB 315a associated with the respective generation number 330a has been copied. In some embodiments, an entry 350 in the table 340 comprises a bitmap or a bitfield or a sequence of bits that represents the live and unused locations in the associated VLB 315a at the time (and with respect to the associated generation number 330a) the live information was copied to VLB-comp 335. For example, the bitmap may contain a sequence of bits, such that each bit at a particular index indicates with a 1 that the pointer at that corresponding index in the VLB 315a storage 320a was in use (i.e. points to live data) and indicates with a 0 that the pointer at that corresponding index in the VLB 315a storage 320a was not in use. For example, a sequence of bits 010010011 would indicate that storage locations 0, 2, 3, 5, and 6 were unused and that storage locations 1, 4, 7, and 8 were live. Using the same example, the ordinal of the 1 bits in the bit sequence can be used to locate the respective live pointer in the storage 345 of VLB-comp 335. For example, when accessing the fourth bit (0-indexed and counting from the left) in the bit sequence 010010011, because that is the second 1 in the bit sequence (the first being the 1 in position 1 of the 0-indexed bit sequence), the second location in VLB-comp 345 at the appropriate offset from the respective entry 350 in the table 340 is where the respective live pointer is actually located. In some embodiments, creating an association between the current generation number 330a of VLB 315a and VLB-comp 335 comprises establishing a pointer to VLB-comp 335 and storing it and the generation number 330a as an entry in the generation information mapping 340. In some embodiments, a pointer, sometimes known as a back-pointer, is established from VLB-comp 335 to VLB 315a. In some embodiments, when a garbage collection is initiated, the system will determine whether any VLBs (or VLB-comps) are available for reuse. For example, if a VLB-comp is available for reuse (e.g., because it no longer points to active data), the system can use the back-pointers from that VLB-comp to find the associated VLBs that can be made cleaned up or made available for reuse. In some embodiments, there is a limit on the number of back-pointers that can be stored in a VLB-comp, for example 8. In some embodiments, the generation number 330a associated with VLB 315a is updated, for example, by being incremented. In some embodiments, VLB-comp 335 points to PB 325 by way of live information (e.g., pointers and offsets) in the storage 345 of VLB-comp. In some embodiments, VLB 315a points to PB 325 by way of live information (e.g., pointers and offsets) in the storage 320a of VLB 315a prior to copying the live information to VLB-comp 335. In some embodiments, multiple VLBs can point to the same VLB-comp. In some embodiments, the storage locations 320a that previously pointed to PB 325 are now considered available for reuse, for example, because the live information from VLB 315a has been copied to VLB-comp 335, and the generation mapping information 340 has been updated accordingly.

Figure 4:
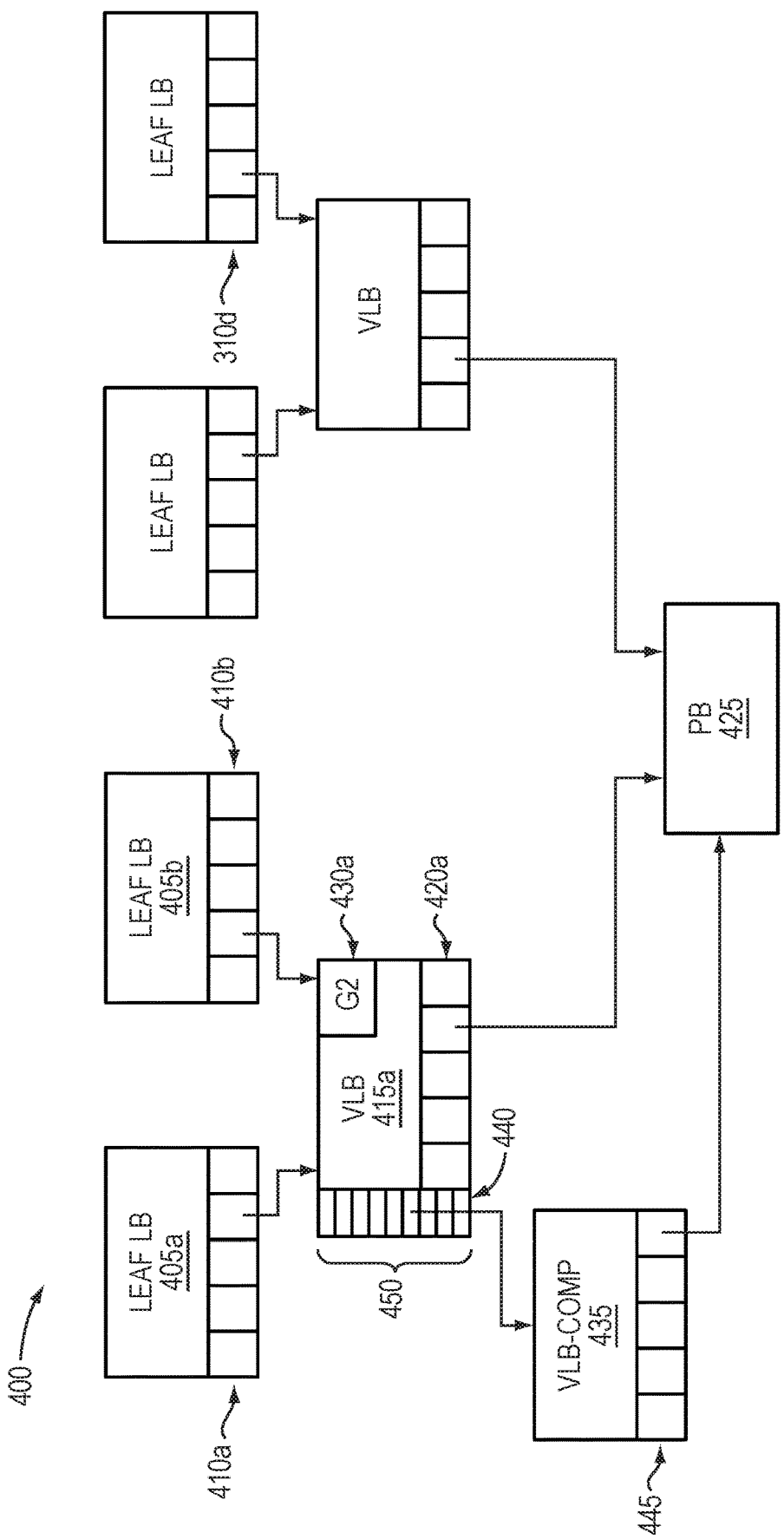
FIG. 4 is a simplified block diagram of an example system, in accordance with an embodiment of the present disclosure.

FIG. 4 depicts an example embodiment of a system that may be used in connection with performing the techniques described herein. Shown is an example portion of a map as described in FIGS. 1, 2, and 3. In some embodiments, leaf LBs associated with different generations of VLBs mat be present in map 400. For example, leaf LB 405a and leaf LB 405b may be associated with generation 1 (G1) of VLB 415a, and leaf LB 405c may be associated with generation 2 (G2) of VLB 415a, the current generation of VLB 415a. When a read command is received relative to leaf LB 405c, the associated VLB generation number associated with the pointer in respective location 410c in leaf LB 405c is retrieved—in this case, G2. When following the pointer to VLB 415a, the current generation number 430a, here G2, is compared with the retrieved generation number, here G2. When the two generation numbers are equivalent, any further pointer lookups are performed relative to the storage 420a in VLB 415a that point to PB 425.

By way of comparison, when a read command is received relative to leaf LB 405a, the associated VLB generation number associated with the pointer in respective location 410a in leaf LB 405a is retrieved—in this case, G1. When following the pointer to VLB 415a, the current generation number 430a, here G2, is compared with the retrieved generation number, here G1. When the two generation numbers are not equivalent, the generation number from leaf LB 405a—G1—is looked up in the generation mapping information 440 associated with VLB 415a and the associated pointer is retrieved from the respective entry 450 (as described above with respect to FIG. 3), here a pointer to VLB-comp 435, whereby the further pointer lookups are performed relative to storage 445 in VLB-comp 435 (as described above with respect to FIG. 3, for example, using a sequence of bits in the entry 450 to locate the appropriate pointer in storage 445 of VLB-comp)—as opposed to the storage 420a in VLB 415a—which may point to a different location in PB 425 or a different PB (not shown).

In some embodiments, one or more VLB-comps may be themselves become sparse, and their live information may be updated to another VLB-comp according to the techniques described herein. In some embodiments, a VLB-comp that has been made completely free of live information is returned to a pool of virtual blocks that are available for reuse.

Figure 5A:
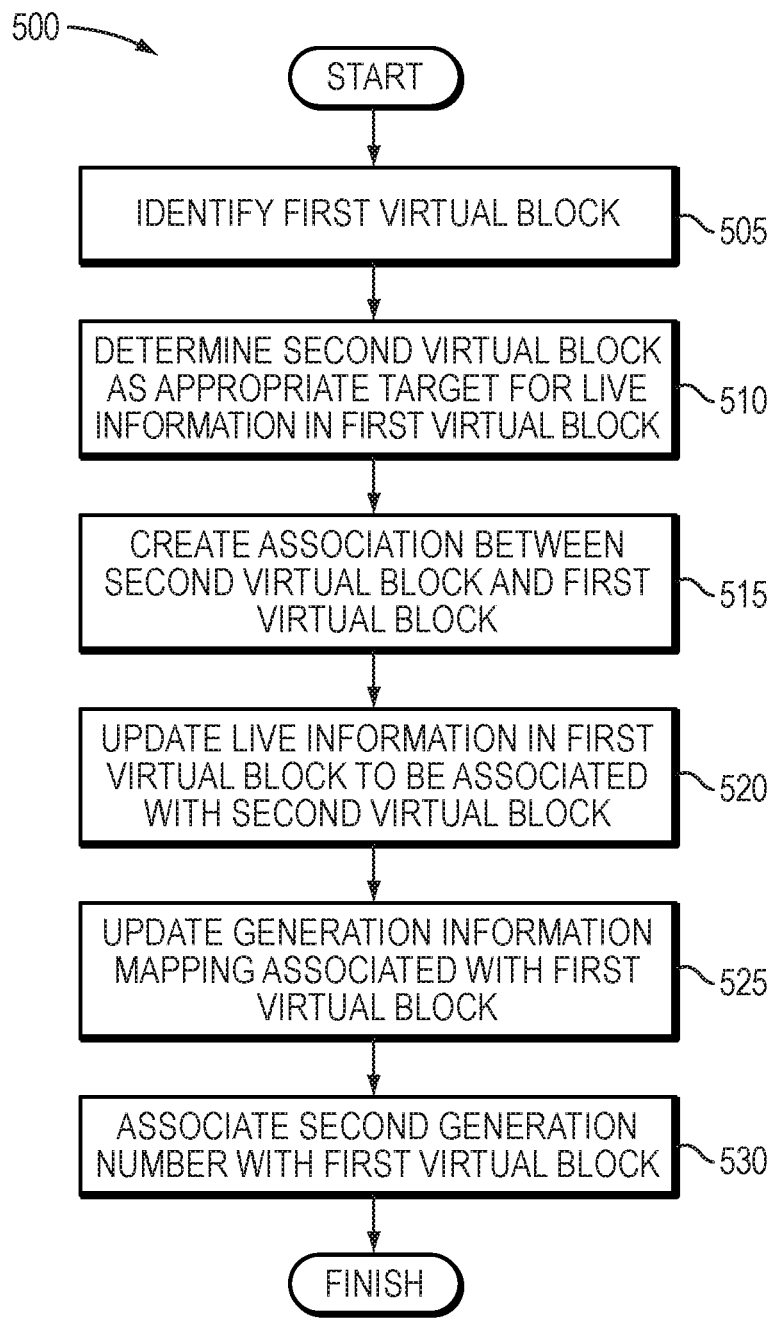
FIGS. 5A and 5B are a simplified illustration of an example flow diagram, in accordance with an embodiment of the present disclosure.

FIGS. 5A and/or 5B illustrates a flow diagram 500 illustrating an example embodiment of a method that may be used in connection with performing the techniques described herein. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIGS. 5A and/or 5B and described below is not intended to be limiting.

In some embodiments, method 500 may be implemented in one or more processing devices (e.g., a digital processor, an analog processor, a digital circuit designed to process information, an analog circuit designed to process information, a state machine, a virtual machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

FIG. 5A illustrates method 500, in accordance with one or more embodiments. An operation 505 may include identifying a first virtual block, for example VLB 315a as explained above. The first virtual block may be associated with a first generation number, for example 330a as explained above. In some embodiments, the first generation number is stored inside the first virtual block. Operation 505 may be performed by one or more hardware processors configured by machine-readable, in accordance with one or more embodiments. An operation 510 may include determining a second virtual block (for example, VLB-comp 335, as shown above) as an appropriate target for live information in the first virtual block. Operation 510 may be performed by one or more hardware processors configured by machine-readable instructions, in accordance with one or more embodiments. An operation 515 may include creating an association between the second virtual block and the first virtual block. Operation 515 may be performed by one or more hardware processors configured by machine-readable instructions, in accordance with one or more embodiments. An operation 520 may include updating the live information in the first virtual block to be associated with the second virtual block. Operation 520 may be performed by one or more hardware processors configured by machine-readable instructions, in accordance with one or more embodiments. An operation 525 may include updating a generation information mapping (for example, generation information mapping 340, as shown above) associated with the first virtual block. Operation 525 may be performed by one or more hardware processors configured by machine-readable instructions, in accordance with one or more embodiments. An operation 530 may include associating a second generation number with the first virtual block. Operation 530 may be performed by one or more hardware processors configured by machine-readable instructions, in accordance with one or more embodiments.

In some embodiments, operation 505 may be in response to a determination to perform a garbage collection. In some embodiments, operation 505 may include determining that the first virtual block is sparse. In some embodiments, operation 525 may be based on the first generation number, and the association between the second virtual block and the first virtual block. In some embodiments, operation 510 may include comparing the size of available space in the second virtual block to the size of the live information of the first virtual block.

Figure 5B:
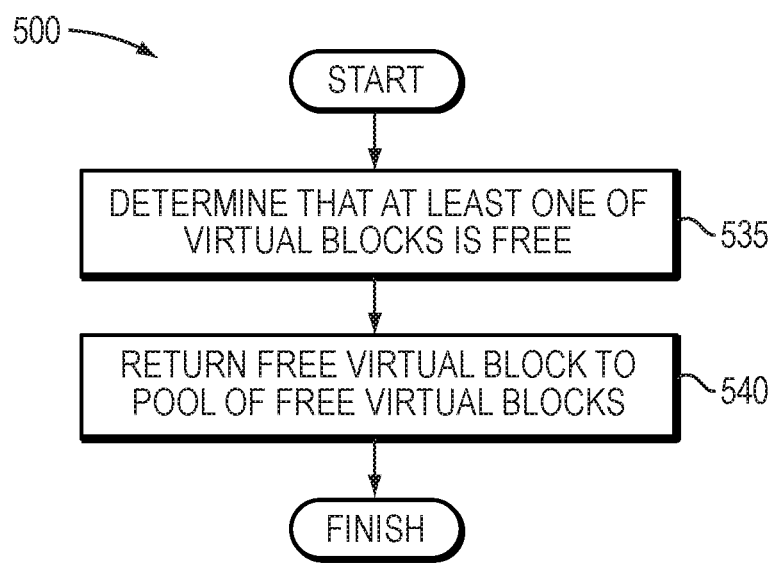

FIG. 5B illustrates method 500, in accordance with one or more embodiments. An operation 535 may include determining that at least one of the virtual blocks is free. Operation 535 may be performed by one or more hardware processors configured by machine-readable instructions, in accordance with one or more embodiments. An operation 540 may include returning the free virtual block to a pool of free virtual blocks. Operation 240 may be performed by one or more hardware processors configured by machine-readable instructions including a module that is the same as or similar to block returning module 150, in accordance with one or more embodiments.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 6:
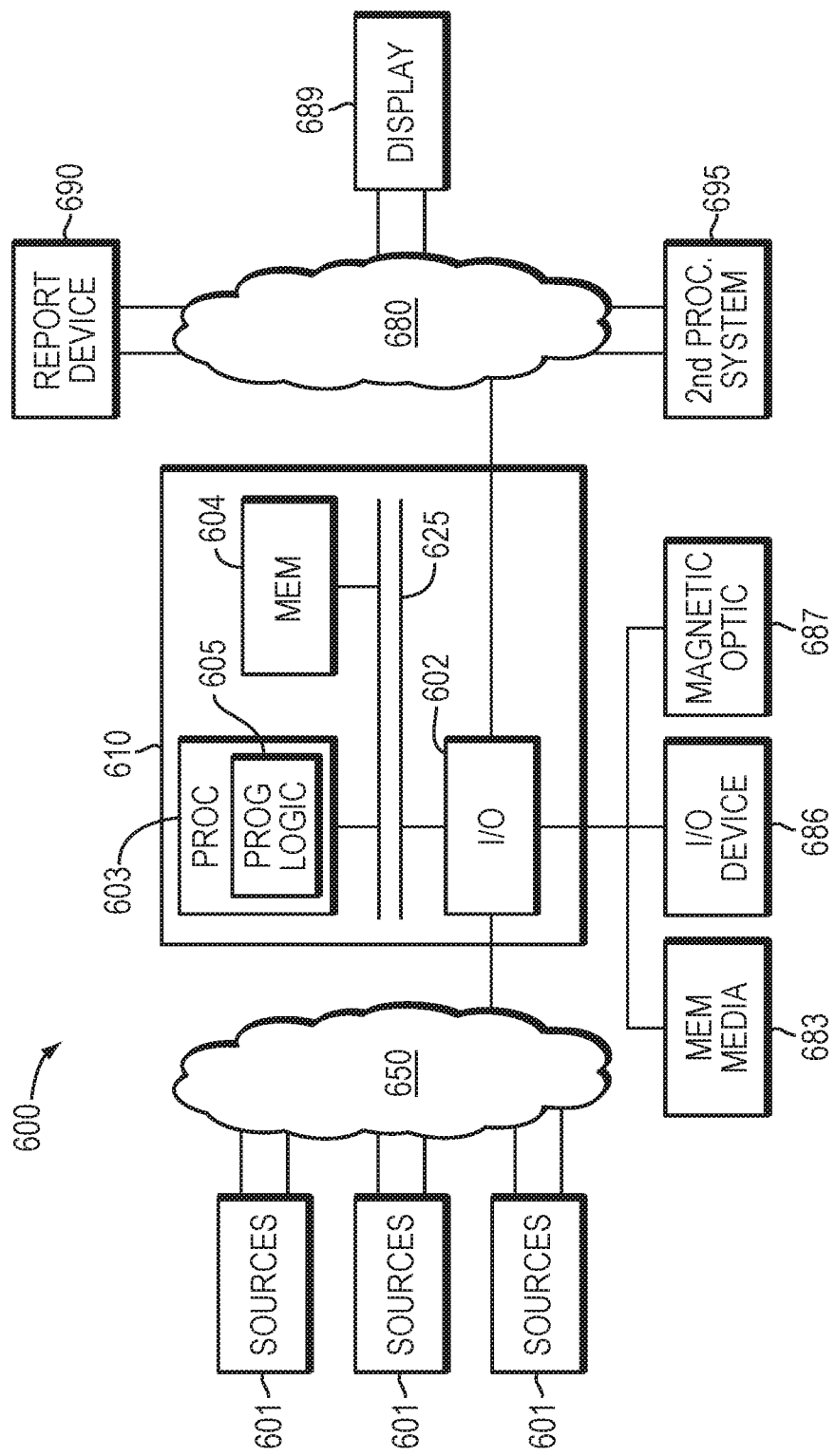
FIG. 6 is an example of an embodiment of an apparatus that may utilize the techniques described herein, in accordance with an embodiment of the present disclosure.

FIG. 6 is a block diagram illustrating an apparatus, such as a computer 610 in a network 600, which may utilize the techniques described herein according to an example embodiment of the present invention. The computer 610 may include one or more I/O ports 602, a processor 603, and memory 604, all of which may be connected by an interconnect 625, such as a bus. Processor 603 may include program logic 605. The I/O port 602 may provide connectivity to memory media 683, I/O devices 685, and drives 687, such as magnetic drives, optical drives, or Solid State Drives (SSD). FIG. 6 also illustrates sources 601, interconnects 650 and 680, $2^{nd}$ proc. System 695, display 689, and report device 690. When the program code is loaded into memory 604 and executed by the computer 610, the machine becomes an apparatus for practicing the invention. When implemented on one or more general-purpose processors 603, the program code combines with such a processor to provide a unique apparatus that operates analogously to specific logic circuits. As such, a general purpose digital machine can be transformed into a special purpose digital machine.

Figure 7:
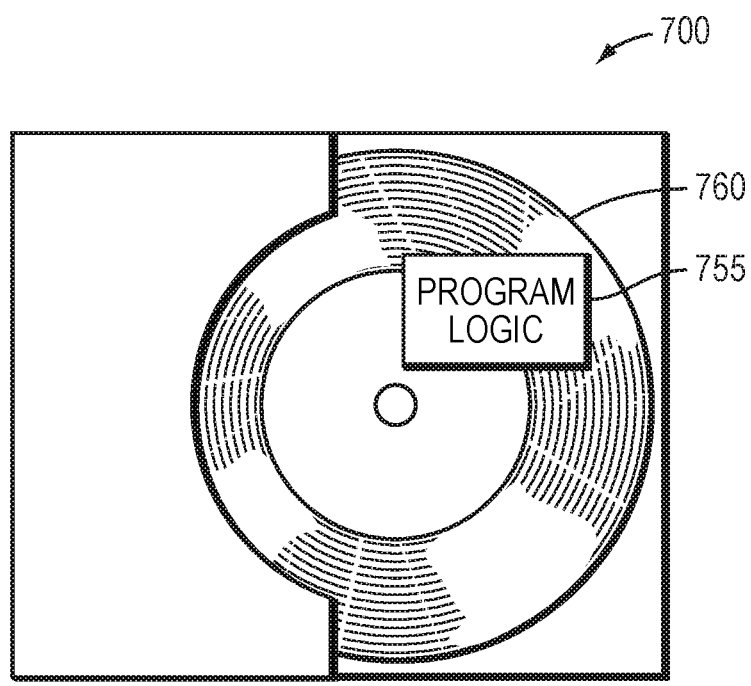
FIG. 7 is an example of a method embodied on a computer readable storage medium that may utilize the techniques described herein, in accordance with an embodiment of the present disclosure.

FIG. 7 is a block diagram illustrating a method embodied on a computer readable storage medium 760 that may utilize the techniques described herein according to an example embodiment of the present invention. FIG. 7 shows Program Logic 755 embodied on a computer-readable medium 760 as shown, and wherein the Logic is encoded in computer-executable code configured for carrying out the methods of this invention and thereby forming a Computer Program Product 700. Program Logic 755 may be the same logic 605 on memory 604 loaded on processor 603 in FIG. 6. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
    identifying a first virtual block, the first virtual block being associated with a first generation number;
    determining a second virtual block as an appropriate target for live information in the first virtual block;
    creating an association between the second virtual block and the first virtual block;
    copying the live information from the first virtual block to the second virtual block;
    updating a generation information mapping associated with the first virtual block;
    associating a second generation number with the first virtual block;
    receiving a read request associated with the first virtual block; and
    comparing generation numbers associated with the first and second virtual blocks to determine whether live information associated with the read request is stored in the first or second virtual block.

2. The method of claim 1, wherein the identifying the first virtual block is in response to a determination to perform a garbage collection.

3. The method of claim 1, wherein identifying the first virtual block comprises determining that the first virtual block is sparse.

4. The method of claim 1, wherein the updating the generation information mapping associated with the first virtual block is based on the first generation number, and the association between the second virtual block and the first virtual block.

5. The method of claim 1, wherein determining the second virtual block as an appropriate target comprises comparing the size of available space in the second virtual block to the size of the live information of the first virtual block.

6. The method of claim 1, further comprising:
   determining that at least one of the virtual blocks is free; and
   returning the free virtual block to a pool of free virtual blocks.

7. The method of claim 1, wherein the first generation number is stored in the first virtual block.

8. The method of claim 1, wherein updating the generation information mapping associated with the first virtual block comprises:
   storing, in the generation information mapping, at least one pointer to the live information in the second virtual block and the first generation number.

9. The method of claim 1, wherein updating the generation information mapping associated with the first virtual block comprises:
   setting entries in the generation information mapping to identify storage locations in the first virtual block that no longer point to live data.

10. The method of claim 1, further comprising:
    overwriting storage for the live information in the first virtual block to at least one predetermined value that indicates that the storage no longer points to live data.

11. A system, comprising:
    one or more processors; and
    computer-executable program logic operating in memory, wherein the computer executable program logic enables execution across the one or more processors of:
        identifying a first virtual block, the first virtual block being associated with a first generation number;
        determining a second virtual block as an appropriate target for live information in the first virtual block;
        creating an association between the second virtual block and the first virtual block;
        copying the live information from the first virtual block to the second virtual block;
        updating a generation information mapping associated with the first virtual block;
        associating a second generation number with the first virtual block;
        receiving a read request associated with the first virtual block; and
        comparing generation numbers associated with the first and second virtual blocks to determine whether live information associated with the read request is stored in the first or second virtual block.

12. The system of claim 11, wherein the identifying the first virtual block is in response to a determination to perform a garbage collection.

13. The system of claim 11, wherein identifying the first virtual block comprises determining that the first virtual block is sparse.

14. The system of claim 11, wherein the updating the generation information mapping associated with the first virtual block is based on the first generation number, and the association between the second virtual block and the first virtual block.

15. The system of claim 11, wherein determining the second virtual block as an appropriate target comprises comparing the size of available space in the second virtual block to the size of the live information of the first virtual block.

16. The system of claim 11, wherein the computer executable logic program enables further execution across one or more processors of:
    determining that at least one of the virtual blocks is free; and
    returning the free virtual block to a pool of free virtual blocks.

17. The system of claim 11, wherein the first generation number is stored in the first virtual block.

18. The system of claim 11, wherein the computer executable logic program enables further execution across one or more processors of:
    storing, in the generation information mapping, at least one pointer to the live information in the second virtual block and the first generation number.

19. The system of claim 11, wherein the computer executable logic program enables further execution across one or more processors of:
    setting entries in the generation information mapping to identify storage locations in the first virtual block that no longer point to live data.

20. The system of claim 11, wherein the computer executable logic program enables further execution across one or more processors of:
    overwriting storage for the live information in the first virtual block to at least one predetermined value that indicates that the storage no longer points to live data.

* * * * *